Nov. 21, 1933.   V. B. TAYLOR   1,936,530
SLACK ADJUSTER
Filed Oct. 5, 1931
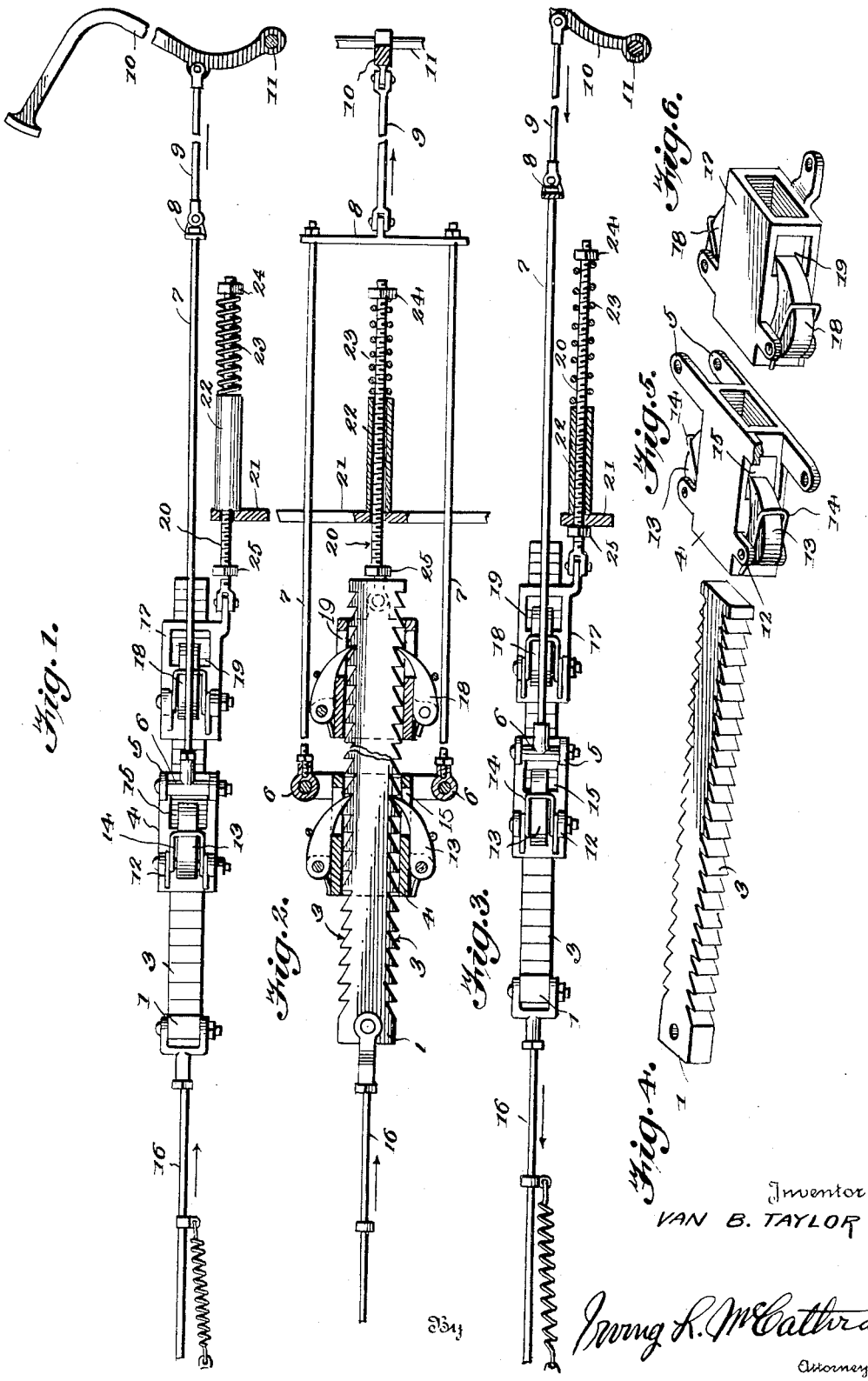
Inventor
VAN B. TAYLOR Patented Nov. 21, 1933

1,936,530

UNITED STATES PATENT OFFICE 1,936,530

SLACK ADJUSTER

Van B. Taylor, Miami, Fla.

Application October 5, 1931. Serial No. 566,942

1 Claim. (Cl. 188—196)

This invention relates to slack adjusters, and has for its object the production of a simple and efficient slack adjuster especially adapted for use in connection with brakes used on motor cars, trucks, and other vehicles whereby the slack or lost motion caused by reason of wear of the brake linings, reach connections, and the like, may be readily and immediately taken up and adjusted and whereby the various parts may be at all times kept in proper mechanical adjustment to prevent loss of life and property.

Another object of this invention is the production of a simple and efficient slack adjuster used in particular in conjunction with motor brakes whereby the brakes may be at all times kept in perfect adjustment without the necessity of expert manual or mechanical aid, the slack adjusting mechanism constituting a simple mechanical structure.

A still further object of this invention is the production of an efficient slack adjuster which is practically indestructible, is positive, and practically instantaneous in action whereby the brakes may be properly adjusted by back-and-forth movement of the brake pedal.

With these and other objects in view, this invention consists in certain novel constructions, combinations and arrangements of parts as will be hereinafter fully set forth in the following specification and claim.

In the drawing:—

Figure 1 is a side elevation of the slack adjuster shown applied in conjunction with a brake pedal;

Figure 2 is a longitudinal section through portions of the slack adjuster, certain other portions being shown in top plan view;

Figure 3 is a side elevation of the slack adjuster similar to Figure 1 except that the adjuster is shown in its full forward position;

Figure 4 is a detail perspective of the ratchet bar used in connection with the present device;

Figure 5 is a detail perspective, certain parts being shown in section of the ratchet pull casing; and Figure 6 is a detail perspective of the ratchet adjusting casing or housing.

By referring to the drawing, it will be seen that 1 designates the ratchet bar which is provided with rearwardly inclined ratchet teeth 3 upon opposite sides of the ratchet bar 1, as shown clearly in the drawing. Slidably mounted upon the ratchet bar 1 is a pull housing or casing 4, which pull housing or casing 4 is provided near its forward end and upon each side with a pair of spaced ears 5, each pair of ears 5 engaging a journal 6, each journal 6 being preferably engaged to a single pull rod 7, as shown. These pull rods 7 may be secured to a pull yoke 8 connected to a brake rod 9 pivotally secured to the brake pedal 10, which brake pedal may be secured in any suitable or convenient manner such for instance as upon the supporting shaft 11. The pull housing or casing 4 is also provided near its rear end and upon each side, with a pair of spaced ears 12. A pawl 13 is pivotally mounted between each pair of spaced ears 12, as shown in the drawing, and a suitable spring 14 is carried by each side of the housing or casing 4 for engaging the pawls 13 and holding these pawls in engagement with the ratchet teeth 3 on the ratchet bar 1. The housing or casing 4 is provided upon each side thereof with a notch 15, through which notches extend the pawls 13 for facilitating the engagement with the ratchet teeth 3 of the ratchet bar 1 and at the same time allowing sliding movement of the casing 4 in one direction on the ratchet bar 1, in order to maintain the same zone of travel for the foot pedal after an adjustment has been made. The rear end of the ratchet bar 1 may be connected in any suitable or desired manner to a second pull rod 16, which pull rod 16 may be connected to the brake mechanism in any suitable or desired manner.

Slidably mounted upon the ratchet bar 1 and preferably in advance to the pull casing or housing 4 is an adjusting casing or housing 17 carrying pawls 18 upon the side thereof similar to the pawls 13 previously described carried by the casing 4, these spring pressed pawls 18 extending through notches 19 formed in the sides of the adjusting casing or housing 17 for proper engagement with the ratchet teeth 3 of the ratchet bar 1.

An elongated threaded adjusting rod 20 extends through a suitable support 21 mounted in any convenient or desired manner upon a motor vehicle or other support and this threaded rod 20 also extends through a guiding sleeve 22 preferably carried by the support 21. A coil spring 23 is mounted upon the outer end of the rod 20 and an adjusting nut 24 is threaded upon the outer extremity of the rod 20 for the purpose of adjusting the tension of the spring 23, the spring 23 being interposed between the adjusting nut 24 and one end of the sleeve 22. A second adjusting nut 25 is also adjustably mounted upon the length of the threaded rod 20 and is adapted to be brought into abutting engagement with the support 21 for the purpose hereinafter described.

The operation of the device is as follows:—

Under ordinary conditions when the brake pedal 10 is depressed, the pull rods 7 will cause the ratchet bar 1 to pull forwardly in the direction of the arrows and consequently exert a pulling movement upon the pull rod 16 for applying the brakes or actuating a pull upon the desired mechanism. Should the brakes become worn, or should any slack occur in the length of the pull mechanism and the adjusting nut 25 be brought into abutting relation with the support 21, a continuous forward pull upon the pull rod 9 will cause the ratchet bar 1 to slide in the direction of the pull through the adjusting casing or housing 17, the pawls 18 permitting this forward sliding movement. The slack in this way will be taken up and upon the release of the pedal 10 the mechanism will return to its original position minus the adjustment which has taken place as a result of the forward longitudinal movement of the ratchet bar 1 through the adjusting casing or housing 17. It should be understood, as pointed out above, that the pawls 13 carried by the casing 4 will permit the casing 4 to slide upon the ratchet bar 1 in one direction and likewise the pawls 18 will also allow the casing 17 to slide upon the ratchet bar 1 in one direction, the pawls 13 and 18 in each instance exerting a locking action upon the bar 1 in the opposite direction.

From the foregoing description, it will be seen that a very simple and efficient mechanism has been provided to permit of a proper, efficient, instantaneous, and automatic adjustment for the purpose of taking up slack. It is not desired to limit the present case to that of a brake adjusting mechanism since the same structure may be employed in adjusting or taking up slack in devices of other character. It is further not desired to limit the particular location of the slack adjusting means in conjunction with any other mechanism which may be associated therewith.

Certain detail changes in the mechanical construction may be employed without departing from the spirit of the invention, particularly as to the connection of the pull mechanism which may be connected thereto, so long as these changes fall within the scope of the appended claim.

Having described the invention, what is claimed as new is:—

A slack adjuster of the class described comprising a ratchet adjusting bar, a pull housing mounted upon said ratchet adjusting bar, ratchet means for permitting the sliding movement of said pull housing in one direction upon said adjusting bar, an adjusting housing slidably mounted upon said adjusting bar and having ratchet means engaging said adjusting bar to permit the longitudinal movement of said adjusting bar in one direction through said adjusting housing, adjustable stop means for limiting the bodily movement of said adjusting housing and causing the longitudinal movement of said adjusting bar through said adjusting housing when pull is continued upon said pull housing, said stop means comprising an elongated threaded rod secured to said adjusting housing, tension means carried by said rod, a guiding sleeve engaging said tension means, a support for said rod, and an adjusting nut adjustably mounted upon the length of said rod for abutting engagement with said support.

VAN B. TAYLOR.